United States Patent Office 2,852,889
Patented Sept. 23, 1958

2,852,889
METHOD OF RETAINING PLANT ROOTS IN A DORMANT STATE

Archibald Carlyle Roy, Pointe Claire, Quebec, Canada

No Drawing. Application June 8, 1955
Serial No. 514,096

1 Claim. (Cl. 47—58)

My invention relates to a method of retaining plant roots in a dormant state for an extended period of time.

The object of the invention is to increase the storage life of plants and thereby extend the length of the planting season. Under existing conditions the planting season is limited to a short period of time before the plants progress appreciably in active growth. Planting usually has to be effected during a period of two to three weeks and it is the object of my invention to extend this short planting season almost indefinitely.

My method of retaining plants in a state of dormancy consists of packing the plant roots in a soil medium in package form and freezing said package.

A factor of importance concerned with the successful operation of my method resides in the retention of adequate moisture in the frozen soil and to this end it is desirable that provision be made for preventing the contents of the package from drying out by loss of moisture. A preferred method of preventing such loss of moisture consists of wrapping the plant root and soil package in suitable moisture proof material. The wrapping is preferably accomplished before effecting the freezing operation and the wrapped package frozen in a compact mass.

In carrying out my invention it is essential that the roots be entirely packed in and surrounded by a soil medium and not merely packed and frozen in an uncovered bare state, and furthermore that the temperature be sufficiently low to freeze the entire package in a compact mass.

The method of arresting growth is of great importance commercially inasmuch as the control of the planting time can be effected out of season and consequently determine the time of flowering or fruiting, thus enabling same to be accomplished at pre-selected times.

The use of the words "plant roots" is for illustration only and not by way of limitation as I contemplate the method to be applicable to various sorts of bulbs, corms, roots, etc.

What I claim as new is:

A method for increasing the storage life of winter-hardy plant roots, which are dormant and devoid of stems, which consists of enclosing or burying the entire dormant root system in a soil medium in package form and completely freezing said root system and soil medium in the package form, into a completely frozen compact mass.

References Cited in the file of this patent

UNITED STATES PATENTS

| | | |
|---|---|---|
| 92,578 | Burson | July 13, 1869 |
| 1,789,068 | Colle | Jan. 13, 1931 |
| 1,988,691 | Lovett | Jan. 22, 1935 |
| 1,998,238 | Howeth | Apr. 16, 1935 |
| 2,592,052 | McKenna | Apr. 8, 1952 |
| 2,616,220 | Welch | Nov. 4, 1952 |

FOREIGN PATENTS

| | | |
|---|---|---|
| 898,794 | France | July 17, 1944 |
| 22,409 | Great Britain | of 1893 |

OTHER REFERENCES

Publications: Circular 447 of U. S. Department of Agriculture, published October, 1937, entitled "The Freezing Temperatures of Some Fruits, Vegetables and Florists' Stocks." Pages 1 through 10.

"Botany" (Hill et al.), second edition, published by McGraw-Hill (N. Y.), 1950. Pages 238 and 239.